United States Patent
Moyer et al.

(10) Patent No.: US 8,060,730 B2
(45) Date of Patent: Nov. 15, 2011

(54) SELECTIVE MISR DATA ACCUMULATION DURING EXCEPTION PROCESSING

(75) Inventors: William C. Moyer, Dripping Springs, TX (US); Jimmy Gumulja, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 523 days.

(21) Appl. No.: 12/130,012

(22) Filed: May 30, 2008

(65) Prior Publication Data
US 2009/0300249 A1    Dec. 3, 2009

(51) Int. Cl.
*G06F 11/07* (2006.01)
(52) U.S. Cl. ....................................... 712/227
(58) Field of Classification Search .................. None
See application file for complete search history.

(56) References Cited

U.S. PATENT DOCUMENTS

| | | | |
|---|---|---|---|
| 5,485,467 A | 1/1996 | Golnabi | |
| 5,541,879 A | 7/1996 | Suh et al. | |
| 5,617,021 A | 4/1997 | Goetting et al. | |
| 5,672,966 A | 9/1997 | Palczewski et al. | |
| 5,841,867 A | 11/1998 | Jacobson et al. | |
| 5,900,757 A | 5/1999 | Aggarwal et al. | |
| 5,940,605 A * | 8/1999 | Aoki | 703/26 |
| 6,055,660 A * | 4/2000 | Meaney | 714/732 |
| 6,115,763 A * | 9/2000 | Douskey et al. | 710/72 |
| 6,158,033 A * | 12/2000 | Wagner et al. | 714/726 |
| 6,249,893 B1 * | 6/2001 | Rajsuman et al. | 714/741 |
| 6,311,311 B1 | 10/2001 | Swaney et al. | |
| 6,615,379 B1 * | 9/2003 | Tripp et al. | 714/736 |
| 2002/0129300 A1 | 9/2002 | Floyd et al. | |
| 2002/0178403 A1 | 11/2002 | Floyd et al. | |
| 2004/0216061 A1 | 10/2004 | Floyd et al. | |
| 2005/0138501 A1 * | 6/2005 | Motika et al. | 714/724 |
| 2006/0282732 A1 * | 12/2006 | Kiryu | 714/738 |
| 2007/0174750 A1 * | 7/2007 | Borin | 714/732 |

OTHER PUBLICATIONS

Nagle, H. T. et al., Microprocessor Testability, 1989, IEEE, IEEE Transactions on Industrial Electronics vol. 36, No. 2, pp. 151-163.*
Dey, S. et al., Using a Soft Core in a SoC Design: Experiences with PicoJava, 2000, IEEE, IEEE Design & Test of Computers, pp. 60-71.*
Huang D.C. et al., Short Paper, A Parallel Transparent BIST Method for Embedded Memory Arrays by Tolerating Redundunt Operations,2002, IEEE, IEEE Transactions on computer design of integrated circuits and systems vol. 21, No. 5, pp. 617-628.*

(Continued)

*Primary Examiner* — Eric Coleman
(74) *Attorney, Agent, or Firm* — Joanna G. Chiu

(57) ABSTRACT

A plurality of test points are located at predetermined circuit nodes in a processing system. Test code which includes a set of software-controllable interrupts is executed using a multiple input shift register (MISR) to generate a MISR signature. One or more selected software-controllable interrupt types are determined. During execution of the test code, the MISR is used to also accumulate data values from the plurality of test points during exception processing of one or more of the software-controllable interrupts within the set of software-controllable interrupts which are of the one or more selected software-controllable interrupt types to generate the MISR signature. A test control register has a plurality of fields, each for selecting or not selecting a corresponding software-controllable interrupt type.

20 Claims, 7 Drawing Sheets

OTHER PUBLICATIONS

Lai, Wei-Cheng et al., Instruction Level DFT for Testing Processor and IP Cores in a System on a Chip, 2001, ACM, 6 pages.*

Crouch, Alfred L.; "Scan Testing (3.1.3) and Logic Built-In Self-Test"; Design for Test for Digital IC'S and Embedded Core Systems; 1999; Title page, Publication Data page, Contents and pp. 96-168; Prentice Hall; New Jersey, USA.

Lyon, Jose A. et al.; "Testability Features of the 68HC16Z1"; International Test Conference '1991; Oct. 26-30, 1991; Cover page; Index and pp. 122-129; IEEE.

U.S. Appl. No. 11/355,681 filed Feb. 2, 2006.
U.S. Appl. No. 11/460,090, filed Jul. 26, 2006.
U.S. Appl. No. 11/460,086, filed Jul. 26, 2006.

* cited by examiner

US 8,060,730 B2

SELECTIVE MISR DATA ACCUMULATION DURING EXCEPTION PROCESSING

FIELD OF THE INVENTION

The present invention relates generally to data processors, and more particularly to testing a data processor.

BACKGROUND OF THE INVENTION

Testing of data processing systems is important to ensure proper operation. Testing may be performed in a factory following manufacture and prior to using the data processing system in a user application. The factory testing ensures an end user receives a properly functioning product. However, during operation of the data processing system by an end user, it may also be desirable to test the data processing system so that any failures which occur during normal operation of the product can be detected.

Currently, to provide a low cost method of real-time testing of the integrity of a data processor, while maintaining reasonable interrupt latency, on-line testing is performed by sampling a collected set of test points within a data processor and accumulating the sampled signals into one or more compressed results via accumulating the sample signals into one or more compressed results via MISRs. A well known technique to permit integrated circuits to be tested during operation is the use of logic testing registers, called Multiple Input Shift Registers (MISRs). Multiple input shift registers implement any of a variety of polynomials by receiving data from various internal nodes of the integrated circuit and performing signature compression and accumulation. The signature compression and accumulation is a series of logic operations which result in a single output value known as a signature value. The signature value is compared with a desired value to determine whether the integrated circuit being tested is functioning correctly. In order to reduce interrupt latency, processors may be designed such that interrupts may be injected into the pipeline, causing the results of uncompleted instructions to be discarded without compression and accumulation. The results are discarded because if the discarded results were otherwise accumulated into a compressed signature, a faulty signature value would result.

Since the testing of the integrated circuit is performed on-line or while the integrated circuit is functioning in a real-world application, it is highly desirable to have minimal impact or intrusiveness on system characteristics. A critical component of real-time systems is the interrupt latency or the amount of time required to respond to an interrupt request. Since on-line testing must not adversely affect the responsiveness of a data processing system, known systems typically completely disable the interrupt exception handling of a data processor when testing with a MISR is performed. As a result, known data processing systems also typically strictly limit the length of MISR test sequences.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Figure 1:
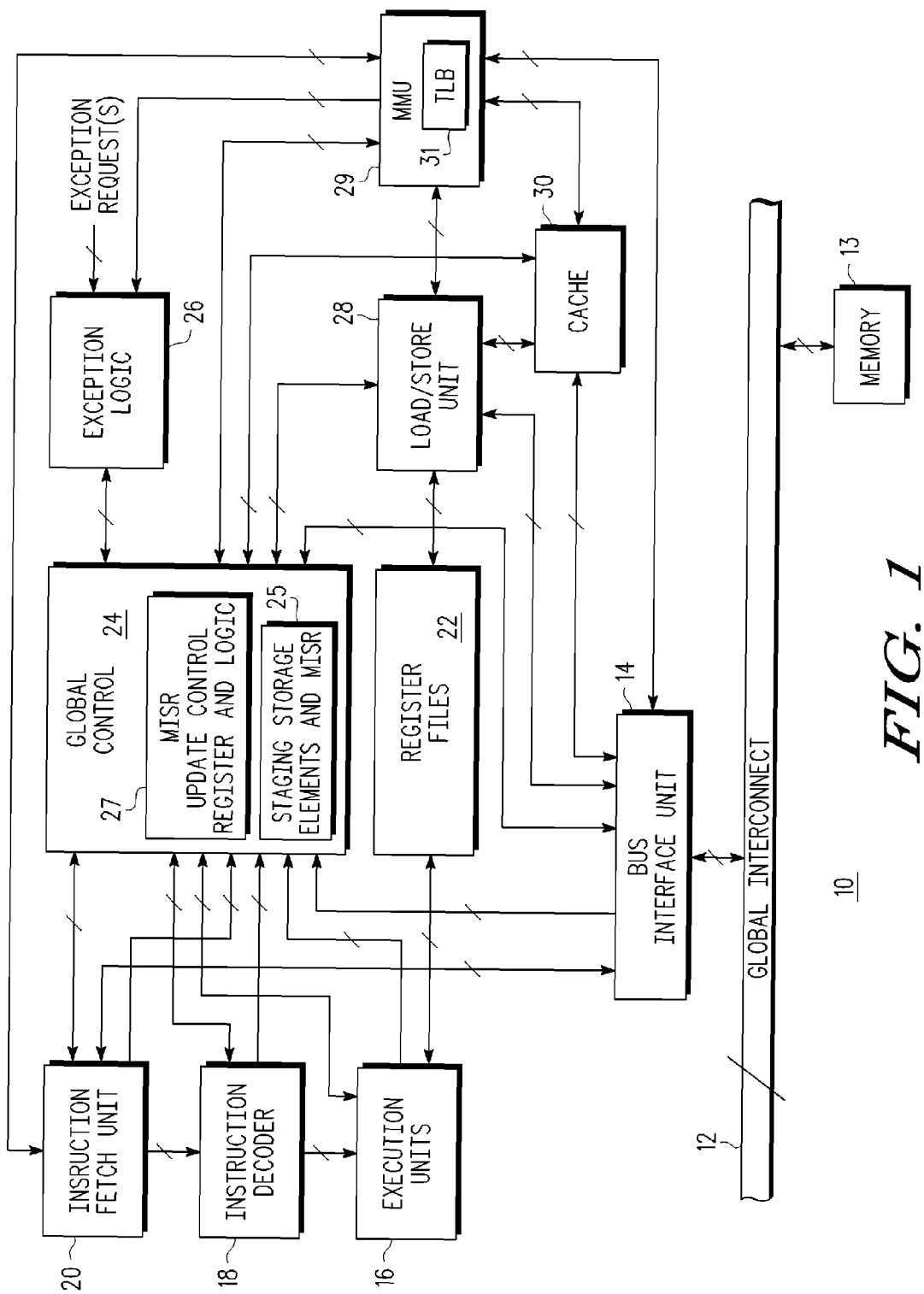
FIG. 1 illustrates a block diagram of a data processing system in accordance with one embodiment of the present invention.

FIG. 1 illustrates a data processing system 10 having efficient deterministic signature generation when placed in a test mode of operation. A multiple-bit global interconnect 12 functions to communicate data within the data processing system 10. A system memory 13 is connected to the global interconnect 12 for storage of information in data processing system 10. A bus interface unit (BIU) 14 has a first input/output connected to the global interconnect 12. The data processing system 10 also includes one or more execution units 16, an instruction decoder 18, an instruction fetch unit 20, register files 22, global control 24, exception logic 26, a load/store unit 28 and a cache 30. A second input/output of the bus interface unit 14 is connected to a first input/output of the instruction fetch unit 20. An output of the bus interface unit 14 is connected to a first input of the global control 24. Additional structural details of a portion of the global control 24 are provided below in connection with FIGS. 5, 6, 8 and 9. The global control 24 is illustrated as having staging storage elements and MISR 25 and MISR update control register and logic 27. A third input/output of the bus interface unit 14 is connected to a first input/output of the load/store unit 28. A fourth input/output of the bus interface unit 14 is connected to a first input/output of cache 30. A second input/output of the instruction fetch unit 20 is connected to a first input/output of the global control 24. A first output of the instruction fetch unit 20 is connected to a second input of global control 24. A second output of the instruction fetch unit 20 is connected to an input of an instruction decoder 18. An input/output of instruction decoder 18 is connected to a second input/output of global control 24. A first output of instruction decoder 18 is connected to a third input of global control 24. An output of the one or more execution units 16 is connected to a fourth input of global control 24. A second output of instruction decoder 18 is connected to a first input of the execution units 16. A third input/output of the global control 24 is connected to a first input/output of execution units 16. A second input/output of execution units 16 is connected to a first input/output of registers files 22. A fourth input/output of the global control 24 is connected to an input/output of exception logic 26. Exception logic 26 also has an input for receiving one or more exception request signals. A fifth input/output of the global control 24 is connected to a second input/output of the cache 30. In some embodiments of data processing system 10, a memory management unit (MMU) is incorporated as part of cache 30. In other forms the MMU is located between the cache 30 and the load/store unit 28 to implement address translation and access permission enforcement. A sixth input/output of the global control 24 is connected to a second input/output of the load/store unit 28. A third input/output of the load/store unit 28 is connected to a second input/output of the register files 22. A fourth input/output of the load/store unit 28 is connected to a third input/output of the cache 30. A seventh input/output of global control 24 is connected to fifth input/output of the bus interface unit 14. In the illustrated form a MMU 29 has a first input/output connected to an eighth input/output of global control 24. An output of MMU 29 is connected to a second input/output of the exception logic 26. A second input/output of MMU 29 is connected to a third input/output of the instruction fetch unit 20. A third input/output of MMU 29 is connected to a sixth input/output of the bus interface unit 14. A fourth input/output of MMU 29 is connected to a fourth input/output of cache 30. A fifth input/output of MMU 29 is connected to a fifth input/output of load/store unit 28. The MMU 29 has a translation lookaside buffer (TLB) 31 in addition to control logic for performing address translation and enforcing access permissions. It should be understood that other forms of data processing system 10 may not utilize cache 30 but rather use memory that is located outside of the data processing system 10. It should also be understood that the location of control circuitry within the data processing system 10 is implementation specific. For example, various control circuitry will be located within each of the functional units of the instruction fetch unit 20, the instruction decoder 18, the execution units 16 and the register files 22 for more limited or localized control than the global control 24. Illustrated conductors and buses that are multiple bit conductors are represented with a slash through the conductor or bus.

Figure 2:
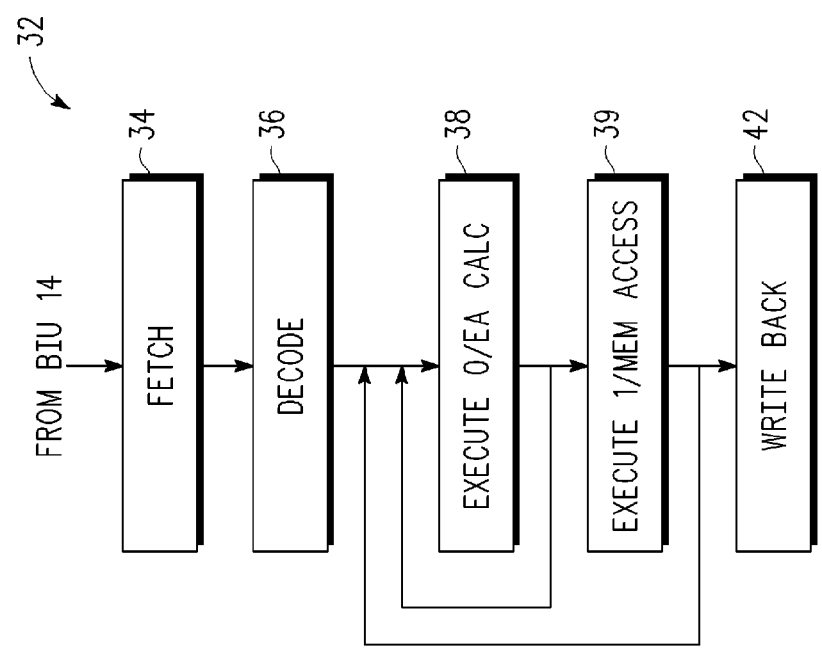
FIG. 2 illustrates in flow chart form the functionality of a pipelined operation in the data processing system of FIG. 1.

In operation, data processing system 10 is implemented as a pipelined data processing system. That means that the execution of data processing instructions occurs in discrete time intervals in which a particular function in the execution occurs during each time interval. For example, reference to a pipeline 32 in FIG. 2 will illustrate one form of data processing pipelining. In one form, instruction execution advances in a pipeline in response to a system clock wherein each cycle of the system clock may advance the execution by one stage.

In a first operation an instruction is fetched in a pipeline stage 34 from the bus interface unit 14 by the instruction fetch unit 20. In a pipeline stage 36, the fetched instruction is coupled to the instruction decoder 18 from the instruction fetch unit 20 and decoded. The resulting decoded instruction is then coupled to execution units 16 and instruction execution begins in a pipeline stage 38. In some forms the instruction execution occurs during two cycles of the system clock. In the illustrated form in the pipeline stage 38 a first phase of instruction execution labeled "execute 0" occurs. Alternatively for a memory operation an effective address (EA) calculation occurs. Depending upon the instruction functionality, the result of pipeline stage 38 is fed back and used as a subsequent input. In a pipeline stage 39 instruction execution is completed with a second phase labeled "execute 1". Alternatively for a memory operation a memory access is performed. Depending upon the instruction functionality, the result of pipeline stage 39 is fed back and used as a subsequent input. In a pipeline stage 42 a result writeback, such as to register files 22, is performed. The various pipeline stages which are described herein are defined herein as "staging". In other words, staging is the operation of a data processing system in specific pipeline stages each having a predetermined function or functions. Staging is also the association of specific hardware circuitry with the functions of each stage in the ordered sequence which forms the data processing pipeline. In general address translation from virtual addresses used by the instruction pipeline to physical addresses used to address data in cache 30 and memory 13 occurs within the MMU 29. Virtual addresses are communicated between the MMU 29 and the instruction fetch unit 20 and load/store unit 28. Physical addresses are communicated between the MMU 29 and the cache 30 and memory 13. The TLB 31 is a cache for the processor of data processing system 10 that speeds up virtual address translation. TLB 31 has a fixed number of page table entries which map virtual addresses onto physical addresses. TLB 31 is typically implemented as a content addressable memory (CAM) in which the search key is a virtual address and the search result is a physical addresses. If the requested address is present a CAM search yields a match very quickly and the physical address is used to address cache 30 or memory 13. When the requested address is not in the TLB 31, a miss occurs and an exception occurs which is sent to exception logic 26. The exception logic 26 implements a page table lookup process to obtain the missing physical address. Page tables may be located within the MMU 29 or elsewhere within data processing system 10. Other exceptions may be generated by the MMU 29 such as when a received virtual address is out-of-range of a permissible range of addresses, or when a permissions violation occurs due to insufficient access permissions.

Data processing system 10 has a real-time test capability that permits testing of various test points located at predetermined circuit nodes within the functional circuitry of the data processing system. For example, the various test points may be located within any or all of the functional blocks illustrated in FIG. 1. The real-time testing of data processing system 10 is accomplished with staging storage elements and MISR 25 that is within the global control 24. Each of the staging storage elements is a storage element such as a register, flip-flop or other data retention structure. One or more of the stages of the pipeline of the data processing system may utilize at least one staging storage element. Each of these staging storage elements is coupled via the buses illustrated in FIG. 1 to receive test data directly from the plurality of test points. In this manner each of the staging storage elements receives and stores test data occurring at a particular pipeline stage. A MISR within the staging storage elements and MISR 25 is coupled to receive test data from the staging storage elements and provides a MISR result that is typically referred to as a MISR signature. A MISR signature is generated by accumulating the values of specific test points and test data from the staging storage elements during execution of a predetermined number of processor instructions. The value of the MISR signature and the structure of the MISR itself is polynomial specific and test point specific and will thus vary from implementation to implementation. The MISR result can be compared with an expected MISR value for the implemented polynomial and a determination made whether the data processing system is working correctly. In alternate embodiments, the staging storage elements and MISR 25 are located anywhere within the data processing system.

Multiple MISR registers may be implemented to allow for a larger number of test points to be captured for signature generation. Additionally, it is desirable to be able to accumulate the values of test points associated with various stages of the processing pipeline in order to allow testing of logic elements within the various stages. One difficulty that arises however is that various instructions are present in the different pipeline stages at each point in time the MISR registers are updated. A change in the relationship between the contents of the various pipeline stages can result in incorrect final accumulated signature values from the MISR registers, which would be interpreted as a failure. This change in relationship can occur due to the injection of interrupts, or due to stalling of one or more stages of the pipeline such as from varying memory access times occurring for memory accesses processed in one or more pipeline stages. To avoid this, prior art systems have required that interrupts be disabled during the accumulation of a MISR signature, and further have required that no indeterminate processor stall cycles occur during MISR signature accumulation. These restraints place a severe limitation on interrupt responsiveness since interrupts must be blocked from occurring during execution of a sequence of instructions which are used to generate a MISR signature value. Also, any indeterminacy in the number of cycles an instruction spends in each stage of the processor pipeline must be likewise avoided in order to accumulate a deterministic MISR signature. Cycle indeterminacy is especially problematic if a cache memory is used to hold the instruction stream or data operands, since a cache miss event can cause a stall of one or more pipeline stages, and cause an incorrect accumulation of the same test point values during multiple clocks while one or more portions of the pipeline are stalled. In some embodiments, load and store accesses to memory outside of or within data processing system 10 may not have deterministic timing due to common events like bus arbitration uncertainties, higher level caches, refresh events to dynamic memory, etc. In some pipeline embodiments, stages of the pipeline may be loosely coupled, such that a stall in a later pipeline stage does not directly cause an immediate stall in an earlier stage. For example, a load instruction stalled in the execute 1 pipeline stage 39 of the illustrated pipeline 32 may not cause a subsequent instruction which was delayed in the fetch pipeline stage 34 due to an extended memory access from flowing through the decode pipeline stage 36 and execute 0 pipeline stage 38 while the execute 1 pipeline stage 39 is stalled. Such changes in relationships are not readily handled by conventional systems which do not incorporate the test point staging capability provided by the staging storage elements and MISR 25.

Registers files 22 are general purpose register files and are shared between the load/store unit 28 and the execution units 16. The load/store unit 28 operates in response to the global control 24 and provides data to and receives data from the bus interface unit 14. The load/store unit 28 also provides data to and receives data from the general purpose registers within the register files 22. Exception logic 26 functions to generate any of various types of data processing exceptions. An interrupt request may be generated and provided to the exception logic 26 in response to various events either within the illustrated data processing system 10 or from sources external to the data processing system 10. For example, instruction execution latency resulting from the generation of wait states may cause the generation of an exception as may the occurrence of faults resulting from instruction execution errors. Various types of real-time interrupt requests may also be received by exception logic 26 via one or more interrupt (also referred to as exception) request inputs.

Figure 3:
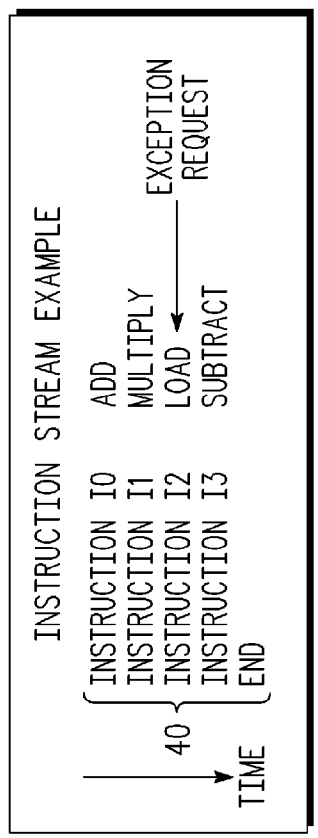
FIG. 3 illustrates in table form an exemplary instruction stream that is executed within the data processing system of FIG. 1.

As an example of a pipelined instruction execution, refer to FIG. 3 which illustrates an exemplary instruction stream. A group of instructions 40 which are executed sequentially in time is provided. For example, a first instruction labeled I0 is an Add instruction and instructs data processing system 10 to add two operands. A second instruction I1 is executed which directs the data processing system 10 to multiply two operands. A third instruction I2 is executed which directs the data processing system 10 to load an operand in a specified location and a fourth instruction I3 is a subtract instruction to calculate a difference between two specified operands. However, assume that as instruction I2 starts to execute, an exception request is received by the exception logic 26. In this case, execution of the group of instructions 40 is interrupted at a boundary between the completion of instruction I1 and instruction I2. Such an interruption may occur, for example, if the load instruction causes a TLB 31 miss or a permission violation occurs during an address translation or a lookup process, or if an external bus error is received during the load operation.

Figure 4:
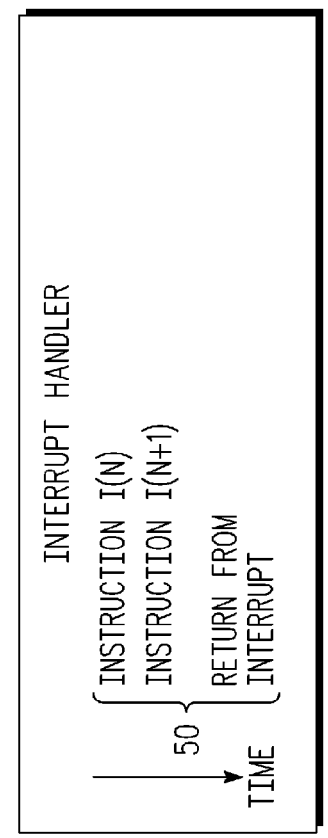
FIG. 4 illustrates in table form an exemplary instruction flow for an interrupt handler performed by the data processing system of FIG. 1.

Illustrated in FIG. 4 is an exemplary interrupt instruction flow which occurs when handling an interrupt as one form of an exception request. A group of instructions 50 is illustrated for sequential execution in time by an interrupt handler. A first instruction of the group of instructions 50 is an instruction I(N) and a second instruction of the group of instructions 50 is an instruction I(N+1). After execution of instruction I(N+1) a return from interrupt (RTI) instruction is executed which redirects instruction flow back to instruction I2 of FIG. 3.

Figure 5:
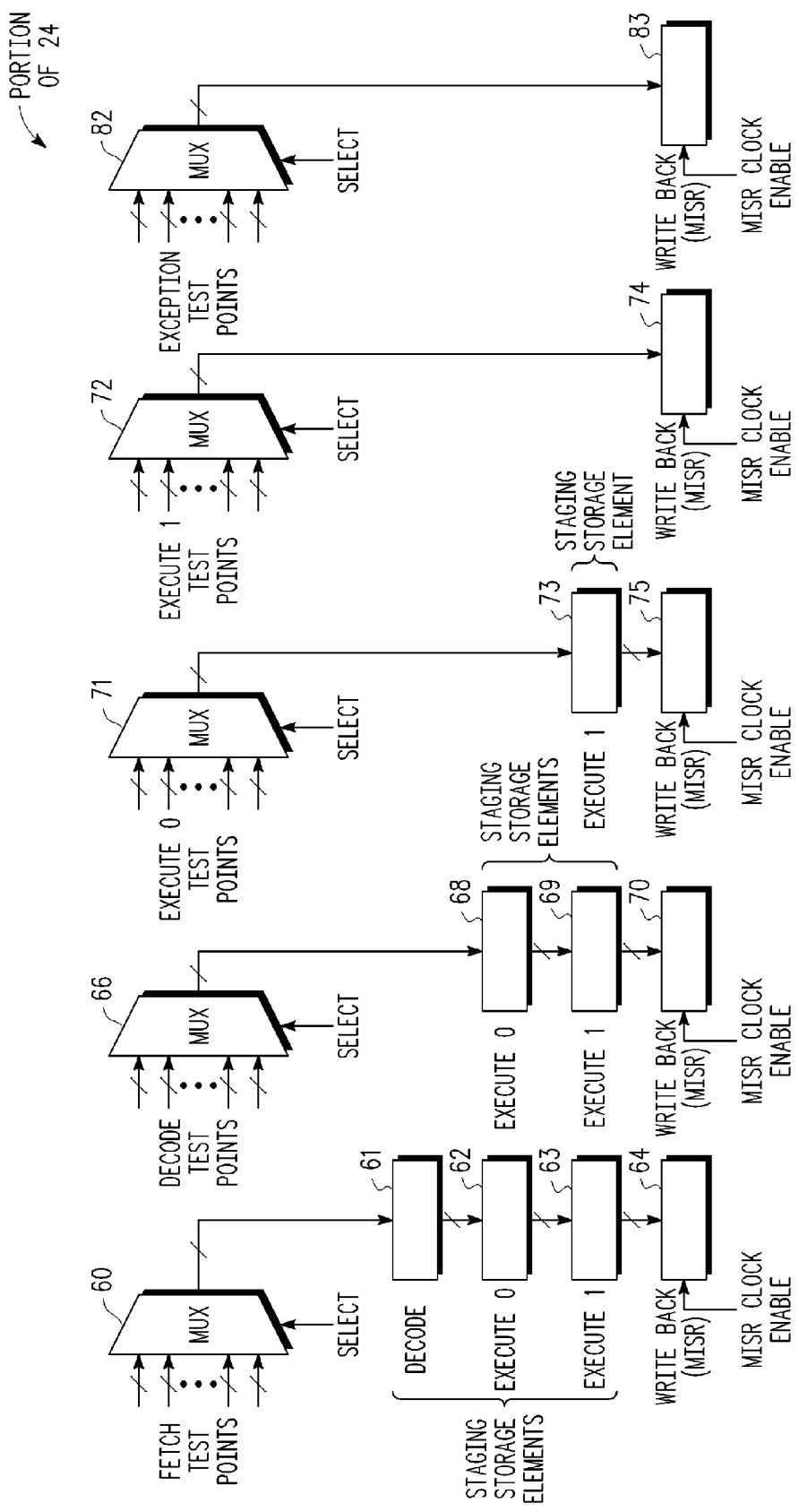
FIG. 5 illustrates in block diagram form an exemplary form of a portion of the global control circuitry of the data processing system of FIG. 1.

Illustrated in FIG. 5 is a portion of the global control 24 which details the staging storage elements of a MISR associated with various types or classes of test points within data processing system 10. The MISR function is to test a large plurality or variety of points within the data processing system 10. For example, a plurality of fetch test points are identified within the instruction fetch unit 20. These fetch test points are electrically connected to respective inputs of a multiplexor (Mux) 60. A Select signal is connected to a control input of multiplexor 60. A plurality of decode test points is identified within the instruction decoder 18. These decode test points are electrically connected to respective inputs of a multiplexor (Mux) 66. The Select signal is connected to a control input of multiplexor 66. A plurality of execute test points within the execution units 16 are identified. These execute test points are electrically connected to respective inputs of a multiplexor (Mux) 72. The Select signal is connected to a control input of multiplexor 72. Any number of test points may be implemented. Typically a number of test points that is a multiple of two is selected. While FIG. 1 illustrated test point information be connected from the instruction fetch unit 20, the instruction decoder 18, the execution units 16 and the bus interface unit 14, it should be understood that test points may also be implemented in other portions of data processing system 10 including the exception logic 26, the load/store unit 28, register files 22 and cache 30. Additionally, independent select signals may be used for the various test point multiplexors illustrated in FIG. 5. For some embodiments, some or all of the multiplexors may not be used, and the test points may be directly coupled to one or more of a plurality of staging storage elements or MISRs. An output of multiplexor 60 is sequentially clocked through a plurality of staging storage elements. Each staging storage element is correlated to a specific stage of the pipeline of the data processing system 10 subsequent to the instruction fetch stage. For example, storage element 61 corresponds to the decode stage of the pipeline. Storage element 62 corresponds to the first execute stage, execute 0, of the pipeline. Storage element 63 corresponds to the second execute stage, execute 1, of the pipeline. The output of multiplexor 60 is connected to an input of storage element 61. An output of storage element 61 is connected to an input of storage element 62. An output of storage element 62 is connected to an input of storage element 63. An output of storage element 63 is connected to an input of a MISR 64. The MISR 64 corresponds to the writeback stage of the pipeline. MISR 64 has a control input for receiving the MISR clock enable signal. In operation, sampled test point values propagate from one staging storage element to the next in concert with the pipeline advancing instructions from the corresponding pipeline stage to the next.

Similarly, a multiplexor 66 is provided having a plurality of inputs that are respectively connected to one of a plurality of test points within the instruction decoder 18. An output of multiplexor 66 is sequentially clocked through a plurality of staging storage elements. Each staging storing element is correlated to a specific stage of the pipeline of the data processing system 10 subsequent to the decode stage. For example, storage element 68 corresponds to the first execute stage, execute 0, of the pipeline. Storage element 69 corresponds to the second execute stage, execute 1, of the pipeline. The output of multiplexor 66 is connected to an input of storage element 68. An output of storage element 68 is connected to an input of storage element 69. An output of storage element 69 is connected to an input of a MISR 70. The MISR 70 corresponds to the writeback stage of the pipeline. MISR 70 has a control input for receiving the MISR clock enable signal.

A multiplexor 71 is provided having a plurality of inputs that are respectively connected to one of a plurality of test points within the Execute 0 stage of execution units 16. An output of multiplexor 71 is sequentially clocked through a staging storage element 73 that is correlated to the second execute stage, execute 1, of the pipeline. The output of multiplexor 71 is connected to an input of storage element 73. An output of storage element 73 is connected to an input of a MISR 75. The MISR 75 corresponds to the writeback stage of the pipeline. MISR 75 has a control input for receiving the MISR clock enable signal. A multiplexor 72 is provided having a plurality of inputs that are respectively connected to one of a plurality of test points within the Execute 1 stage of execution units 16. A control input of multiplexor 72 is connected to the select signal. An output of multiplexor 72 is connected to an input of a MISR 74. The MISR 74 corresponds to the writeback stage of the pipeline. MISR 74 has a control input for receiving the MISR clock enable signal. In the illustrated form, storage elements 61-63, 68-69 and 73 are the staging storage elements of staging storage elements and MISR 25. A multiplexor 82 is provided having a plurality of inputs that are respectively connected to one of a plurality of exception test points within the data processing system 10. A control input of multiplexor 82 is connected to the select signal. An output of multiplexor 82 is connected to an input of a MISR 83. The MISR 83 corresponds to the writeback stage of the pipeline. The MISRs 64, 70, 74, 75 and 83 are the MISR elements of the staging storage elements and MISR 25. From the combination of the figures discussed to this point it is apparent that a MISR implementation has been provided having reduced exception handling latency because of the staging correlation of storage elements. The staging storage elements permit the use of selective MISR writebacks so that exception handling does not have to be disabled completely when testing of a data processing system occurs. Additionally, the staging storage elements allow exception processing to occur real-time without putting additional values in the MISR storage devices which would result in an incorrect value in one or more of the MISRs. Without the use of the staging storage elements and the associated control over clocking of the MISR registers by use of the MISR clock enable, the inputs to the MISRs 64, 70, 74, 75 and 83 would not be correlated to the sequential execution of the group of instructions 40. Thus the presence of an interrupt occurring during execution of the group of instructions 40 would cause accumulation of test point values from the group of instructions 50 as well as from the subsequent refetching of instructions I2 and I3, and the re-decoding of instruction I2, resulting in an incorrect signature value. It should be noted that in some embodiments the MISR clock enable signals to the various MISR registers shown in FIG. 5 are independently controlled or enabled such that all or some of the clock enables used to update a new MISR accumulation value may be disabled while others remain enabled. In one embodiment the MISR clock enable for MISR register 83 may be operated independently of the MISR clock enables of MISR registers 64, 70, 74 and 75 and may not always correspond to the writeback stage of the processor pipeline. The selective enablement of the MISR clock enables provides enhanced test flexibility. Selective MISR updating enables more focused signature generation.

Figure 6:
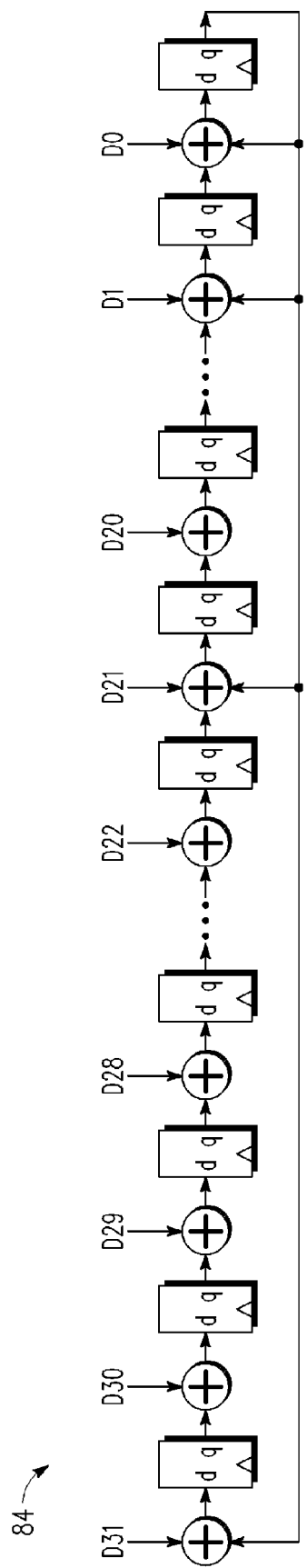
FIG. 6 illustrates in logic diagram form an exemplary multiple input shift register (MISR) for use in the data processing system of FIG. 1.

Illustrated in FIG. 6 is an example of a MISR circuit 84 that may be used for any of the MISRs 64, 70, 74, 75 and 83 of FIG. 6. The MISR circuit 84 is a plurality of serially connected logic exclusive OR gates and conventional D/Q flip-flop storage circuits. Each D terminal represents an input and each Q output represents an output. Each exclusive OR gate has a first input for receiving a data value that represents one of the selected test points. In the illustrated form the MISR circuit 84 is storing thirty-two test points. Each exclusive OR gate also has a second input for receiving an output of an immediately preceding flip-flop. The left-most exclusive OR gate receives an input from a right-most flip-flop. Several exclusive OR gates also have a third input for receiving the output from the right-most flip-flop. Which exclusive OR gates have two inputs and which have three inputs is polynomial-specific. The implementation of MISR circuitry is conventional and will therefore not be discussed in further detail. MISR circuit 84 receives deterministic values from test points in the data processing system and compresses these values into a test value known as a signature as conventional MISRs operate.

Figure 7:
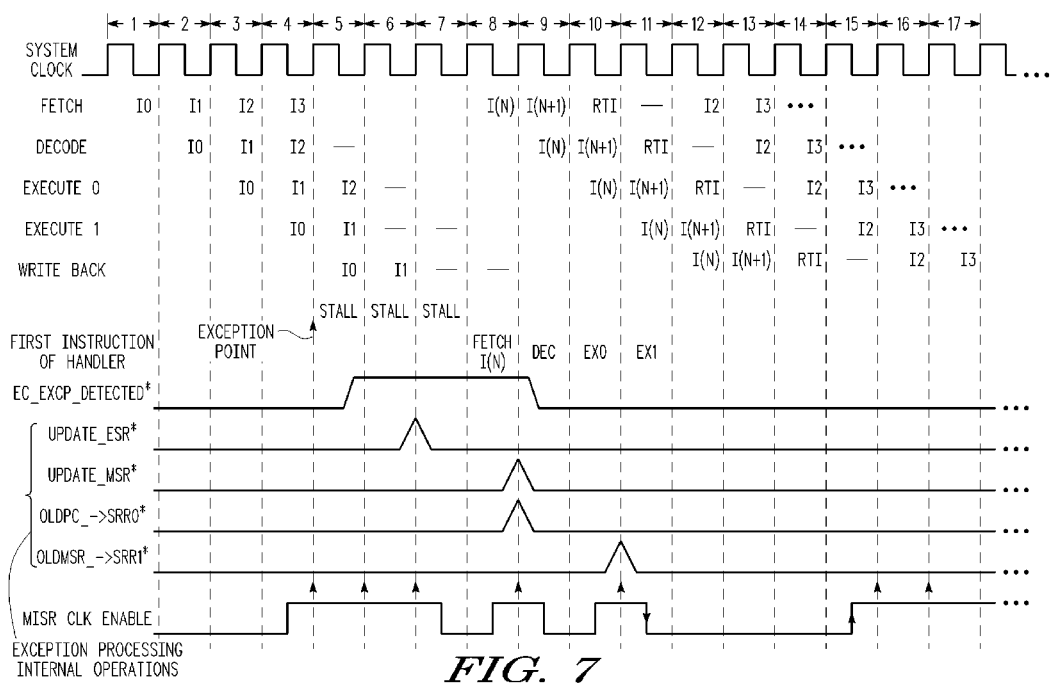
FIG. 7 illustrates in timing chart form an exemplary operation of the data processing system of FIG. 1 during exception processing.

Referring to FIG. 7 an instruction stream example of FIGS. 3 and 4 is further illustrated with a timing chart. Pipeline stages are identified as fetch, decode, execute 0, execute 1 (i.e. two stages of execution) and writeback as was explained above in connection with FIG. 2. A system clock is provided by the global control 24 and controls the length of each phase of a stage. The system clock is a synchronous clock of a predetermined frequency. For purposes of explanation, the synchronous clock has sequentially numbered cycles or phases. Two sequential phases of opposite states form a single clock cycle. In the illustrated example the first instruction I0 has been fetched, decoded and is in the second stage of execution when the exception request that is illustrated in FIG. 3 is acknowledged. FIG. 7 illustrates this point in time as an exception point at the beginning of clock cycle five. The instruction I1 is in the first stage of execution when the exception request is acknowledged, but instruction I2 has not begun execution. Assume that the priority of the exception request is such that no interrupt latency due to continued instruction stream execution is desired. The exception detection signal (EC_EXCP_DETECTED) signal is in an active state during a portion of cycle five of FIG. 7 and therefore prior to the start of execution of instruction I2 in execute stage 1/mem access. Upon detection by circuitry of global control 24 of a non-interrupted instruction being in the second execution stage of the pipeline, a MISR clock (Clk) enable signal is active. In the illustrated form assume that a logic high signal is the active state. When the MISR clock enable signal is active (logic high in the illustrated form), a new MISR accumulation will occur on the next rising edge of the clock. The logic state of the MISR clock enable signal prior to cycle four is inactive as a result of non-illustrated instruction flow that was immediately prior to instruction I0. The MISR clock enable signal transitions to an active state during the cycle four. At the rising clock edge that begins cycle five, the MISR of staging storage elements and MISR 25 captures the data value for instruction I0 that is being written to storage during a writeback stage of the pipeline. Assuming that the exception request signal is acknowledged during cycle five, the first interrupt signal I(N) is fetched during cycle eight and writebacks of instructions I0 and I1 respectively occur during the rising edges of cycles five and six. The pipeline is stalled from fetching and decoding any new instructions during cycles five, six and seven due to the exception condition causing the pipeline to be flushed. Execution of instruction I2 is aborted after cycle five and instructions I0 and I1 complete execution and the writeback of results. Due to the latency associated with the internal exception handling, internal state saving, and instruction redirection of data processing system 10 within exception logic 26, no fetching of a first exception instruction occurs until cycle eight. Therefore, the pipeline is also stalled during cycle seven.

The circuitry of global control 24 detects during cycle four that an instruction is completing execution in the second execute stage (execute 1) of the pipeline. The data associated with this executed instruction will need to be stored in the MISR of the staging storage elements and MISR 25 so the MISR Clk Enable signal transitions to an active state during the fourth clock cycle. At the beginning of the fifth clock cycle a MISR update occurs as is indicated by the darkened upward pointing arrow immediately above the MISR Clk Enable signal. Because the circuitry of global control 24 detects during cycle five that a non-interrupted instruction, instruction I1, is completing execution in the second execute stage of the pipeline, the MISR clock enable signal remains active during cycle five. Also during cycle five the instruction decoder 18 is flushed so that its contents are nulled out to a predetermined value as indicated by the "dash" mark of FIG. 7 during cycle five. Upon the rising clock edge that begins cycle six, the executed data value for instruction I1 is captured by the MISR of the stage elements and MISR 25 as indicated by the darkened upward pointing arrow immediately above the MISR Clk Enable signal. During cycle six the circuitry of global control 24 detects that no instruction is completing execution in the second execute stage (execute 1) of the pipeline since further execution of instruction I2 was aborted due to the exception condition. However, the MISR clock enable signal is not made inactive. Exception logic 26 is configured to implement a series of exception processing internal operations illustrated in FIG. 7. A first exception processing operation is labeled Update_ESR and implements the function of updating an exception syndrome register which is within the register files 22. Updating the ESR is performed as part of the internal exception processing to capture a set of exception condition flags for later access by software. This internal operation does not correspond to a normal instruction writeback stage however. Both the MISR clock enable signal and a control bit within a field of a test control register 90 illustrated in FIG. 8 determine whether this exception function is enabled for MISR accumulation.

Figure 8:
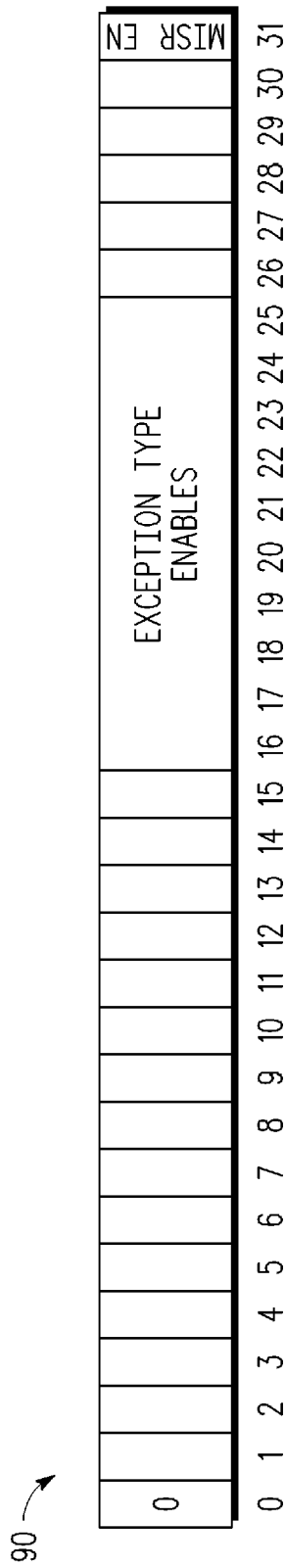
FIG. 8 illustrates in diagram form fields of a test control register for controlling MISR operation during a test mode of the data processing system of FIG. 1.

As illustrated in FIG. 8 the test control register 90 has a field entitled "Exception Type Enables" having multiple bits. The exception type enables field enables particular exceptions for accumulation during the initial cycles of internal exception processing. For example, the following exception sources are conditionally enabled for MISR test point accumulation during the initial cycles of internal exception processing:

SC—A system call
TRAP—A Trap instruction
ILL—An illegal instruction
PRIV—A privileged instruction
TLB error—A translation lookaside buffer (TLB) miss
TLB DSI—A data storage interrupt (DSI) due to permission violation
TLB ISI—An instruction storage interrupt (ISI) due to permission violation
XTE—External precise bus error exception Software may control the generation of one or more of the exceptions with corresponding control bits in response to instruction execution. For example, execution of a system call or trap instruction, or attempted execution of an illegal or privileged instruction may be controlled by including one or more of these instruction types in a subroutine or other instruction storage location which can be processed. TLB 31 errors may be initiated under software control by the configuring of one or more TLB 31 entries in memory management unit 29. External precise bus errors are also controllable by software in some embodiments by bus cycle generation from a load or store instruction which targets a non-existent device, which results in bus error termination on the global interconnect 12. Other bits may be included within the Exception Type Enables field to selectively enable other exception sources under software control. Another field within the test control register 90 is a MISR enable field labeled "MISR EN". In the illustrated form the MISR enable field is a single bit. The Exception Type Enables field is a field of any number of predetermined bits based upon a number of possible exception type conditions which are software controllable for which MISR accumulation operations are desired to be conditionally enabled for internal exception processing operations. While the test control register 90 is illustrated as a thirty-two bit register, it should be understood that any number of bits may be implemented. As stated above, the bits within the Exception Type Enables field are correlated to specific exception condition types and software has control over initiating the exception types corresponding to the individual bits. These exceptions are thus classified as "synchronous" exceptions, since if they occur, they are synchronous to the program flow. Other exception types, such as receiving an external interrupt request, are classified as "asynchronous" exceptions, since their occurrence is typically asynchronous to program flow. All exceptions will implement the noted exception processing internal operations of FIG. 7. However, values for only some of these internal operations are accumulated for only certain synchronous exception types, and are not accumulated for asynchronous exception types, since a predictable exception boundary (and thus predictable accumulated MISR signature values) does not exist for the asynchronous exceptions. If the bit within the Exception Type Enables field corresponding to a particular synchronous interrupt type has a logic one value, the test function of accumulating MISR values in one or more of the registers of MISRs 64, 70, 74, 75 and 83 during updating the exception syndrome register in register files 22 is enabled and the MISR clock enable signal is activated prior to the rising clock edge beginning clock cycle seven. The MISR of MISR update control register and logic 27 is updated with test values associated with the updating of the exception syndrome register in register files 22 as indicated by the darkened upward pointing arrow immediately above the MISR Clk enable signal at the beginning of cycle seven. The internal exception processing sequence is now established so that in the cycle that follows the updating of the ESR value, a first interrupt handler instruction I(N) is fetched. The MISR Clk Enable signal has an inactive or low logic state during a portion of clock cycles seven and eight so that no MISR updating occurs at the edge transition of the beginning of clock cycle eight since no desired exception test points are to be accumulated. Two interrupt handler instructions, instructions I(N) and I(N+1) are fetched respectively in clock cycles eight and nine before a return from interrupt (RTI) is fetched in clock cycle ten. In clock cycle eleven the fetch unit 20 is nulled out before resuming normal instruction execution in cycle twelve by re-fetching instruction I2 whose execution was interrupted during cycle five. The first interrupt handler instruction, I(N), of the interrupt handler is illustrated in FIG. 7 as being fetched in clock cycle eight, decoded in clock cycle nine and executed in clock cycles ten and eleven.

The Update_MSR, OLDPC_→SRR0 and OLDPC_→SRR1 exception processing internal operations are additional internal exception operations which are associated with internal state saving operations that are accumulated when a specific type of interrupt under software control occurs. These internal operations also occur for non-software controlled interrupts, such as asynchronous interrupt requests like "external interrupt request" and "critical interrupt request". However, for asynchronous exceptions, no accumulation occurs during the internal exception processing operations. Software has no idea when in time these asynchronous interrupts will be received since they are asynchronously generated by other components within or external to data processing system 10. Thus a deterministic signature value cannot always be created if these exception types cause accumulations to occur. For these asynchronous exception types, no corresponding Exception Type Enables bit is implemented in some embodiments. When the assigned bit for one of the synchronous exception types has a logic one value, the test function is enabled for performing accumulation during certain initial internal exception processing cycles when the corresponding exception occurs. For example, both the Update_MSR signal and the OLDPC_→SRR0 exception processing signal are active at least at the rising clock edge beginning clock cycle nine. The MISR of MISR update control register and logic 27 is updated with test values associated with these internal operations for enabled exception types in the Exception Type Enables field as indicated by the darkened upward pointing arrow immediately above the MISR Clk enable signal at the rising edge of cycle nine. The test function of updating a save/restore register 0 (SRR0) is performed by updating the save/restore register 0 with the old program counter value. At the rising edge of clock cycle ten the MISR Clk enable signal is not active and thus no MISR update occurs. The OLDMSR_→SRR1 signal is active at least at the rising clock edge beginning at clock cycle eleven. As part of the internal exception processing operations associated with all exceptions, the save/restore register 1 is updated with a prior or old machine state register (MSR) value. If the particular exception type which is being processed has its corresponding Exception Type Enable bit set, then the MISR of MISR update control register and logic 27 is updated with test values associated with this internal exception processing operation as indicated by the darkened upward pointing arrow immediately above the MISR Clk enable signal at the beginning of clock cycle eleven.

The specific exception processing internal operations illustrated in FIG. 7 are by design choice and are functions unique to a specific implementation. Also the order and timing of the exception processing internal operations and the timing are unique to the specific test and the test handler and are determined by software and hardware design. Other software controllable exception types may be provided within the execution type enable field of the test control register 90 for selective enablement during exception processing of the respective exception. Depending upon the desired functions to be tested during exception processing and testing, various exception processing operations will be enabled and disabled within the exception type enable field of the test control register 90. When the RTI instruction begins to be decoded, the MISR update control register and logic 27 of global control 24 transitions the MISR clock enable signal back to an inactive state since it is not desired to accumulate new MISR values for the interrupt handler's instruction execution. Non-interrupt handler instruction processing begins in clock cycle twelve with the fetching, decoding and execution of instructions I2, I3 and beyond due to the execution of the return from interrupt (RTI) instruction at the end of the interrupt handler. In cycle fourteen the global control 24 detects that an RTI instruction is completing execution in the final pipeline stage (writeback) of the execution units 16. Therefore, in the next cycle, during cycle fifteen, the MISR update control register and logic 27 enables the MISR clock enable signal to an active state which remains active as long as instructions are completing execution. The data associated with a completed instruction is stored in the MISR of the staging storage elements and MISR 25 on rising clock edges. For example, the data resulting from the completion of execution of instruction I2 as it enters the writeback stage is stored in the MISR at the rising clock edge of cycle 16 as indicated by the upward pointing arrow immediately above the MISR clock enable signal of FIG. 7. Writeback of that data, the instruction result, to the register files 22 occurs during the rising edge of clock cycle sixteen. The data resulting from the execution of instruction I3 is stored in the MISR at the rising clock edge of cycle seventeen as indicated by the upward pointing arrow immediately above the MISR clock enable signal of FIG. 7. Writeback of that data to the register files 22 occurs during the rising edge of clock cycle seventeen.

Thus it should be appreciated from the timing diagram of FIG. 7 that a pipelined execution of instructions is provided with a MISR function wherein both normal instruction execution results are captured by the MISR as well as a subset of exception processing internal operations for a subset of software controllable exception types. Results from the internal exception processing for certain selected exception types are permitted to influence the MISR and alter the signature value created by the MISR while other exception types are precluded from influencing MISR accumulated values. The instruction flow illustrated in FIG. 7 has both reduced interrupt latency because interrupt processing is not disabled during the MISR operation and increased test coverage for exception control logic. By permitting the exception control logic to alter the MISR signature value for certain well-controlled exceptions under software control, test coverage for the exception control logic is provided.

Illustrated in FIG. 8 is a register 90 functioning under control of a user command. The user command or instruction permits a user of data processing system 10 to have software control to determine what types of exceptions, when they occur and cause the internal operations processing of FIG. 7, will cause accumulation of results in the MISR registers. The command may be implemented as a software instruction and may be part of one or more fields of a data processing instruction rather than a distinct instruction. In the illustrated form the register has specific fields identified as exception type enables described above and a MISR enable field. The MISR enable field is a control signal that enables the general test functionality described herein. In alternate forms the MISR enable field may be subdivided to enable or disable different MISRs associated with various test points in data processing system 10. In other words, the MISR enable field of register 90 may selectively enable some or all of MISRs 64, 70, 74 and 75. The value contained in the MISR enable field of register 90 is used to control generation of the MISR clock enable signal of FIG. 7.

Figure 9:
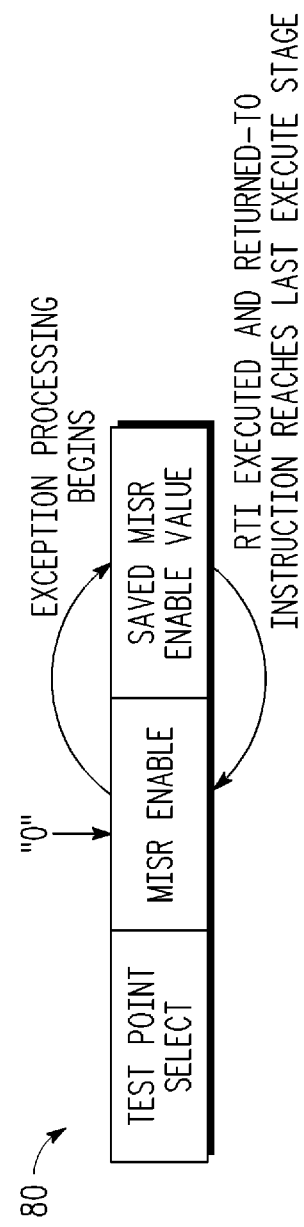
FIG. 9 illustrates in diagram form an exemplary storage device under control of a user command to be used by control circuitry of the data processing system of FIG. 1.

Illustrated in FIG. 9 is an exemplary storage device, a register 80, which is under control of a user command to be used by the global control 24 of the data processing system 10. The register 80 permits user flexibility in providing diagnostic testing for the data processing system 10. When logic within the global control 24 determines exception processing is occurring at an appropriate point in the pipeline (either from an interrupt, a wait state or other exception), the current value of the MISR enable field in the MISR register is saved off. This value is designated in FIG. 9 as a "saved MISR enable value" because it is the enabling value of the MISR prior to the MISR being disabled in response to exception processing being detected. The enable value in the MISR Enable field of the MISR is then nulled to a predetermined disabling value such as "0". Exception processing and exception handler instruction execution then occurs without the MISR being enabled (other than for selected initial internal exception processing cycles for selected exception types via the test control register 90 illustrated in FIG. 8) and no erroneous values are placed into the MISR. Logic circuitry within the global control 24 monitors for the occurrence of an RTI instruction being executed and when the returned-to instruction (i.e. the last normal instruction not executed) reaches the last execution stage in the pipeline. When both of these conditions are met, the saved MISR enable value is transferred back into the MISR enable field of register 80 and MISR enablement occurs if it was previously enabled prior to the exception occurrence. Because exception processing and execution of the interrupt handler is no longer occurring at this point, storage of the correct information into one or more MISRs will begin.

Figure 10:
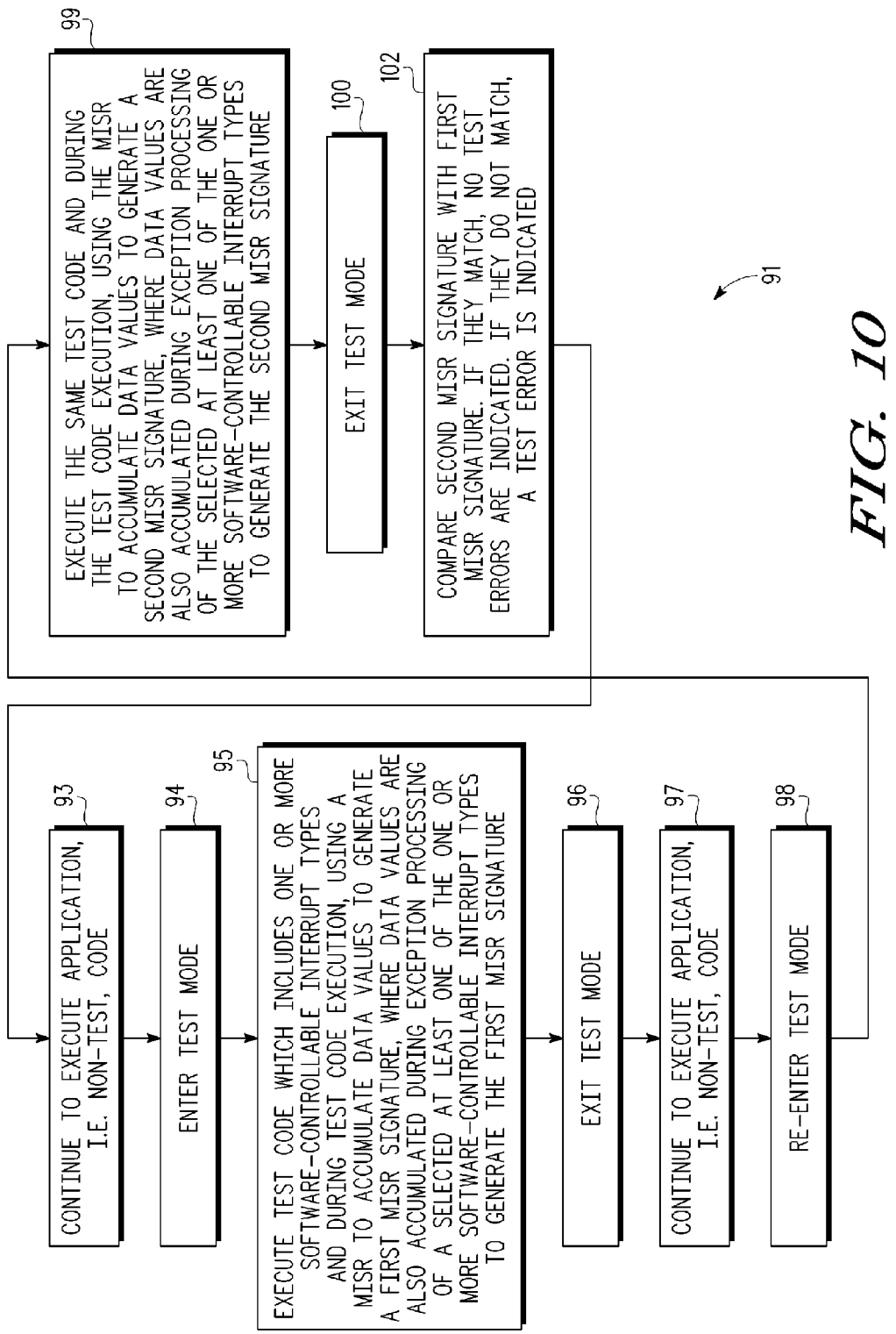
FIG. 10 illustrates in flow chart form an exemplary process flow of exception processing during a test mode of the data processing system of FIG. 1.

Illustrated in FIG. 10 is an example of a method of selective MISR data accumulation during exception processing. During a step 93 instructions of an application are executed and the process continues to execute application code that is non-test code. In a step 94 a test mode is entered. In a step 95 test code is executed which includes one or more software-controllable interrupt types. During the test code execution, a MISR is used to accumulate data values to generate a first MISR signature. In this step data values are also accumulated during initial cycles of exception processing of a selected at least one of the one or more software-controllable interrupt types to generate the first MISR signature. In a step 96 the test mode is exited and in a step 97 execution of the application continues by executing non-test code. In a step 98 the test mode is re-entered. In a step 99 the same test code as executed in step 95 is executed. During the test code execution the MISR is used to accumulate data values to generate a second MISR signature. Data values are accumulated during initial cycles of exception processing of the selected at least one of the one or more software-controllable interrupt types to generate the second MISR signature. In a step 100 the test mode is exited. In a step 102 the second MISR signature is compared with the first MISR signature to determine if the two signatures match each other. If a match occurs, no test error is indicated. However, if the two signatures do not match, a test error is indicated.

By now it should be apparent that there has been provided a method for supporting on-line testing in a data processing system. The on-line testing is user programmable and uses signal staging correlated to the stages of the pipeline to reduce exception processing latency. Exception processing is permitted to occur real-time as opposed to disabling the exception processing function. Errors in the test data are avoided even though exception processing is permitted. By providing data processor pipeline stage staging registers to hold sampled test point signals, the test points can be controllably moved through a series of storage devices which are updated as the processor pipeline advances. The stage values are accumulated into a compressed signature at or near the end of the processor pipeline. Data processing system 10 meets safety requirements when runtime assurance of processor and subsystem functionality is required. The self-test capability described herein is executed during otherwise idle portions of data processing system 10 while it is in operation. On-line testing is performed by users of the system and controlled via software programmed sequences. Data processing system 10 provides a low cost and flexible method to support capturing of various signals throughout a pipelined processor's processing stages by the signature logic while minimizing interrupt latency. Signals are captured during the various stages of the pipeline and the MISR results are updated during the writeback stage to ensure that interrupts do not affect the capability of generating a predictable signature. Test coverage above ninety percent of the system's circuitry can thus be efficiently accomplished. Additional coverage is provided by selectively updating MISR values during specific initial clock cycles of exception processing for selectable or software-identified exceptions, thus providing additional coverage for exception control logic. Debug interrupts, software interrupts, traps, system calls, TLB permission violations and other predetermined operations can be selectively enabled for accumulation during the first predetermined number of cycles of exception processing. This functionality ensures that these asynchronous interrupts can continue to be processed while testing the portions of the exception control and storage logic which can be allowed to cause updates. By controlling which exceptions are allowed to be selectively accumulated, test code may be written by a programmer to cause exceptions requiring accumulation to be triggered synchronously. Efficiency is obtained by staging early pipeline stage signals into the MISR function to minimize interrupt latency and by selectively updating MISRs on two different boundaries of the processing pipeline such as during decode and execute boundaries rather than solely on a writeback boundary.

In one form there is provided method for use in a data processing system wherein a plurality of test points located at predetermined circuit nodes is provided. Test code is executed which includes a set of software-controllable interrupts. During execution of the test code, a multiple input shift register (MISR) is used to accumulate data values from the plurality of test points to generate a MISR signature. The presence of one or more selected software-controllable interrupt types is determined. During execution of the test code, the MISR is used to also accumulate data values from the plurality of test points during exception processing of one or more of the software-controllable interrupts within the set of software-controllable interrupts which are of the one or more selected software-controllable interrupt types to generate the MISR signature. In another form during execution of the test code, an asynchronous exception is received. The MISR is disabled when processing the asynchronous exception. In another form a test control register having a plurality of fields is provided. Each of the plurality of fields is for selecting or not selecting a corresponding software-controllable interrupt type. In another form determining the one or more selected software-controllable interrupt types is implemented by using the test control register to determine the one or more selected software-controllable interrupt types. In another form during execution of the test code, the MISR is disabled from accumulating data values during exception processing of one or more of the software-controllable interrupts within the set of software-controllable interrupts which are not of the one or more selected software-controllable interrupt types. In another form exception processing of the one or more of the software-controllable interrupts within the set of software-controllable interrupts which are of the one or more selected software-controllable interrupt types is implemented by executing a corresponding exception handler in response to detecting an exception caused by the one or more of the software-controllable interrupts. During the exception processing, the MISR is used to accumulate data values during at least one clock cycle which occurs after detecting the exception and prior to executing an initial instruction of the corresponding exception handler. In another form during exception processing of the one or more of the software-controllable interrupts within the set of software-controllable interrupts which are of the one or more selected software-controllable interrupt types, the MISR is used to accumulate data values during one or more clock cycles which are not associated with a writeback stage of an instruction pipeline of the data processing system. In another form when not exception processing, the MISR is used to accumulate data values from the plurality of test points to generate the MISR signature by updating the MISR during a writeback stage of an instruction pipeline of the data processing system. In another form test code which includes the set of software-controllable interrupts is executed a second time. During execution of the test code the second time, the MISR is used to accumulate data values from the plurality of test points to generate a second MISR signature. During execution of the test code the second time, the MISR is used to also accumulate data values from the plurality of test points during exception processing of one or more of the software-controllable interrupts within the set of software-controllable interrupts which are of the one or more selected software-controllable interrupt types to generate the second MISR signature. The second MISR signature is compared to the MISR signature to determine if a test error has occurred.

In another form there is provided a data processing system having a multiple input shift register (MISR) which accumulates data values from a plurality of test points located at predetermined circuit nodes to generate a MISR signature. Test control storage circuitry indicates one or more selected software-controllable interrupt types. Processing circuitry executes processor instructions, wherein the processing circuitry executes test code which includes a set of software-controllable interrupts, wherein during execution of the test code, the MISR accumulates data values from the plurality of test points during exception processing of one or more of the software-controllable interrupts within the set of software-controllable interrupts which are of the one or more selected software-controllable interrupt types to generate the MISR signature. In another form MISR control logic is coupled to the MISR, wherein the MISR control logic disables the MISR during processing of a received asynchronous exception. In yet another form the data processing system has exception logic which, in response to detecting an exception, performs a plurality of internal operations during exception processing. During the exception processing of the one or more of the software-controllable interrupts within the set of software-controllable interrupts which are of the one or more selected software-controllable interrupt types, the MISR accumulates data values from the plurality of test points during one or more of the plurality of internal operations. In another form the processing circuitry implements an instruction pipeline having a writeback stage. During the exception processing of the one or more of the software-controllable interrupts within the software-controllable interrupts which are of the one or more selected software-controllable interrupt types, the MISR does not accumulate data values from the plurality of test points during the writeback stage. In yet another form the processing circuitry, when not exception processing, uses the MISR to accumulate data values from the plurality of test points to generate the MISR signature by updating the MISR during the writeback stage.

In another form there is provided a method in a data processing system. A plurality of test points located at predetermined circuit nodes is provided. Test code is executed which includes a set of software-controllable interrupts, each software-controllable interrupt having a corresponding exception handler. During execution of the test code, a multiple input shift register (MISR) is used to accumulate data values from the plurality of test points to generate a MISR signature. In response to executing a first software-controllable interrupt of the set of software-controllable interrupts, an exception is generated. In response to detecting the exception, at least one operation is performed prior to executing an initial instruction of a first exception handler corresponding to the first software-controllable interrupt. The MISR is also used to accumulate data values from the plurality of test points to generate the MISR signature during the at least one operation. In another form the at least one operation saves current context information. In another form the at least one operation further includes generating a new program counter value for use in execution of the initial instruction of the first exception handler. The MISR is used to accumulate data values from the plurality of test points to generate the MISR signature when saving current context information and when generating the new program counter value. In another form the MISR is used to also accumulate data values from the plurality of test points to generate the MISR signature during the at least one operation by determining one or more selected software-controllable interrupt types. The MISR is used to accumulate data values from the plurality of test points to generate the MISR signature during the at least one operation when the first software-controllable interrupt is of the one or more selected software-controllable interrupt types. In another form the MISR is disabled from accumulating data values during exception processing of the first software-controllable interrupt when the first software-controllable interrupt is of the one or more selected software-controllable interrupt types and when other operations other than the at least one operation are being performed. In yet another form the MISR is disabled from accumulating data values during exception processing of the first software-controllable interrupt when other operations other than the at least one operation are being performed.

In the foregoing specification, the invention has been described with reference to specific embodiments. However, one of ordinary skill in the art appreciates that various modifications and changes can be made without departing from the scope of the present invention as set forth in the claims below. For example, it should be understood that the circuitry described herein may be implemented either in silicon or other semiconductor materials or alternatively by a software code representation of silicon or other semiconductor materials.

Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

What is claimed is:

1. In a data processing system, a method comprising:
   providing a plurality of test points located at predetermined circuit nodes;
   executing test code which includes a set of software-controllable interrupts;
   during execution of the test code, using a multiple input shift register (MISR) to accumulate data values from the plurality of test points to generate a MISR signature;
   determining one or more selected software-controllable interrupt types; and
   during execution of the test code, using the MISR to also accumulate data values from the plurality of test points during exception processing of one or more software-controllable interrupts within the set of software-controllable interrupts which are of the one or more selected software-controllable interrupt types to generate the MISR signature.

2. The method of claim 1, further comprising:
   during execution of the test code, receiving an asynchronous exception; and
   disabling the MISR when processing the asynchronous exception.

3. The method of claim 1, further comprising:
   providing a test control register having a plurality of fields, each of the plurality of fields for selecting or not selecting a corresponding software-controllable interrupt type.

4. The method of claim 3, wherein determining the one or more selected software-controllable interrupt types comprises using the test control register to determine the one or more selected software-controllable interrupt types.

5. The method of claim 1, further comprising:
   during execution of the test code, disabling the MISR from accumulating data values during exception processing of one or more of the software-controllable interrupts within the set of software-controllable interrupts which are not of the one or more selected software-controllable interrupt types.

6. The method of claim 1, wherein exception processing of the one or more of the software-controllable interrupts within the set of software-controllable interrupts which are of the one or more selected software-controllable interrupt types comprises executing a corresponding exception handler in response to detecting an exception caused by the one or more of the software-controllable interrupts, and wherein during the exception processing, the MISR is used to accumulate data values during at least one clock cycle which occurs after detecting the exception and prior to executing an initial instruction of the corresponding exception handler.

7. The method of claim 1, wherein during exception processing of the one or more of the software-controllable interrupts within the set of software-controllable interrupts which are of the one or more selected software-controllable interrupt types, the MISR is used to accumulate data values during one or more clock cycles which are not associated with a writeback stage of an instruction pipeline of the data processing system.

8. The method of claim 7, wherein, when not exception processing, using the MISR to accumulate data values from the plurality of test points to generate the MISR signature comprises updating the MISR during a writeback stage of an instruction pipeline of the data processing system.

9. The method of claim 1, further comprising:
   executing the test code which includes the set of software-controllable interrupts a second time;
   during execution of the test code the second time, using the MISR to accumulate data values from the plurality of test points to generate a second MISR signature;
   during execution of the test code the second time, using the MISR to also accumulate data values from the plurality of test points during exception processing of one or more of the software-controllable interrupts within the set of software-controllable interrupts which are of the one or more selected software-controllable interrupt types to generate the second MISR signature; and
   comparing the second MISR signature to the MISR signature to determine if a test error has occurred.

10. A data processing system, comprising:
    a multiple input shift register (MISR) which accumulates data values from a plurality of test points located at predetermined circuit nodes to generate a MISR signature;
    test control storage circuitry which indicates one or more selected software-controllable interrupt types; and
    processing circuitry which executes processor instructions, wherein the processing circuitry executes test code which includes a set of software-controllable interrupts, wherein during execution of the test code, the MISR accumulates data values from the plurality of test points during exception processing of one or more of the software-controllable interrupts within the set of software-controllable interrupts which are of the one or more selected software-controllable interrupt types to generate the MISR signature.

11. The data processing system of claim 10, further comprising:
MISR control logic coupled to the MISR, wherein the MISR control logic disables the MISR during processing of a received asynchronous exception.

12. The data processing system of 10, further comprising:
exception logic which, in response to detecting an exception, performs a plurality of internal operations during exception processing, wherein during the exception processing of the one or more of the software-controllable interrupts within the set of software-controllable interrupts which are of the one or more selected software-controllable interrupt types, the MISR accumulates data values from the plurality of test points during one or more of the plurality of internal operations.

13. The data processing system of claim 12, wherein the processing circuitry implements an instruction pipeline having a writeback stage, and wherein during the exception processing of the one or more of the software-controllable interrupts within the software-controllable interrupts which are of the one or more selected software-controllable interrupt types, the MISR does not accumulate data values from the plurality of test points during the writeback stage.

14. The data processing system of claim 13, wherein the processing circuitry, when not exception processing, uses the MISR to accumulate data values from the plurality of test points to generate the MISR signature by updating the MISR during the writeback stage.

15. In a data processing system, a method comprising:
providing a plurality of test points located at predetermined circuit nodes;
executing test code which includes a set of software-controllable interrupts, each software-controllable interrupt having a corresponding exception handler;
during execution of the test code, using a multiple input shift register (MISR) to accumulate data values from the plurality of test points to generate a MISR signature;
in response to executing a first software-controllable interrupt of the set of software-controllable interrupts, generating an exception; and
in response to detecting the exception, performing at least one operation prior to executing an initial instruction of a first exception handler corresponding to the first software-controllable interrupt, wherein the MISR is also used to accumulate data values from the plurality of test points to generate the MISR signature during the at least one operation.

16. The method of claim 15, wherein the at least one operation comprises
saving current context information.

17. The method of claim 16, wherein the at least one operation further
comprises generating a new program counter value for use in execution of the initial instruction of the first exception handler, and wherein the MISR is used to accumulate data values from the plurality of test points to generate the MISR signature when saving current context information and when generating the new program counter value.

18. The method of claim 15, wherein using the MISR to also accumulate data values from the plurality of test points to generate the MISR signature during the at least one operation further comprises:
determining one or more selected software-controllable interrupt types; and
using the MISR to accumulate data values from the plurality of test points to generate the MISR signature during the at least one operation when the first software-controllable interrupt is of the one or more selected software-controllable interrupt types.

19. The method of claim 18, further comprising:
disabling the MISR from accumulating data values during exception processing of the first software-controllable interrupt when the first software-controllable interrupt is of the one or more selected software-controllable interrupt types and when other operations other than the at least one operation are being performed.

20. The method of claim 15, further comprising:
disabling the MISR from accumulating data values during exception processing of the first software-controllable interrupt when other operations other than the at least one operation are being performed.

* * * * *